United States Patent [19]

Rametsteiner

[11] 4,384,049
[45] May 17, 1983

[54] COMPOSITION AND PRODUCT COMPRISING A BLEND OF CHLORINATED POLYETHYLENES, A HEAT STABILZING AGENT A CROSS-LINKING AGENT AND A FOAMING AGENT

[75] Inventor: Karl Rametsteiner, Linz, Austria

[73] Assignee: Kunststoffwerk Karl Egger, Linz, Austria

[21] Appl. No.: 253,939

[22] Filed: Apr. 13, 1981

[30] Foreign Application Priority Data

Apr. 21, 1980 [AT] Austria .................................. 2129/80

[51] Int. Cl.$^3$ ........................ C08L 23/28; C08J 9/06; B29D 27/00
[52] U.S. Cl. ...................................... 521/90; 264/22; 264/54; 264/209.6; 264/DIG. 18; 521/92; 521/95; 521/134
[58] Field of Search ................... 264/54, DIG. 18, 22, 264/209.6; 521/90, 92, 95, 134

[56] References Cited

U.S. PATENT DOCUMENTS

| | | | |
|---|---|---|---|
| 3,812,225 | 5/1974 | Hosoda et al. | 264/54 |
| 3,819,543 | 6/1974 | Stastny et al. | 521/95 X |
| 4,146,598 | 3/1979 | Coyne | 521/90 X |
| 4,209,473 | 6/1980 | Coyne | 521/90 X |
| 4,220,730 | 9/1980 | Coyne | 521/90 X |

FOREIGN PATENT DOCUMENTS

| | | |
|---|---|---|
| 1694130 | 10/1970 | Fed. Rep. of Germany . |
| 1769861 | 9/1971 | Fed. Rep. of Germany . |
| 2134211 | 1/1973 | Fed. Rep. of Germany . |
| 57-2342 | 1/1982 | Japan .................................. 521/134 |

*Primary Examiner*—Philip E. Anderson
*Attorney, Agent, or Firm*—Kurt Kelman

[57] ABSTRACT

In the manufacture of bodies of foamed plastic material, a polymeric synthetic resin base material is mixed with a cross-linking agent, a foaming agent and at least one further additive. The resulting mixture is shaped without a decomposition of the cross-linking and foaming agent and is subsequently heated to effect cross-linking and foaming. In order to obtain bodies of foamed plastic materials which owing to their high flexibility and low flammability are particularly suitable as heat-insulating materials in buildings, the base material consists only of a chlorinated polyethylene resin or a mixture of such resins and heat-stabilizing agents known for use with halogen-containing polymers are incorporated in the mixture.

2 Claims, No Drawings

COMPOSITION AND PRODUCT COMPRISING A BLEND OF CHLORINATED POLYETHYLENES, A HEAT STABILZING AGENT A CROSS-LINKING AGENT AND A FOAMING AGENT

This invention relates to a process of manufacturing bodies of foamed plastic material, wherein a polymeric synthetic resin base material is mixed with a cross-linking agent, a foaming agent and at least one further additive, the resulting mixture is shaped without decomposition of the cross-linking and foaming agents, and is subsequently heated to effect cross-linking and foaming.

German Early Disclosure No. 1,694,130 discloses such a process, in which the base material consists of a mixture of a polyolefin and a rubber and/or a synthetic resin. The cross-linking agent consists of an organic peroxide, such as dicumyl peroxide, 2,5-dimethyl-2,5-di(tert.butylperoxy)-hexane, di-tert.butylperterephthalate or tert.butyl-hydroperoxide. The foaming agent consists, e.g., of azodicarbonamide or dinitrosopentamethylenetetramine. The foamed plastic materials made by that process are good heat and sound insulators but have the disadvantage that their flexibility is relatively low and that they are readily inflammable so that they have only a restricted usefulness as insulating materials in buildings. Whereas their flexibility can be improved by an addition of rubber, this will increase their flammability. An addition of fire-retarding agents, such as highly brominated diphenyl ethers or antimony trioxide, will result in a higher resistance to fire but also in a higher hardness and appreciably add to the manufacturing costs.

It is an object of the invention to eliminate these disadvantages and to provide a process by which bodies of foamed plastics can be manufactured which have a high flexibility and a low flammability.

This object is accomplished according to the invention in that the base material consists only of one or more chlorinated polyethylene resins and that at least one heat-stabilizing agent known for use with halogen-containing polymers is incorporated in said mixture.

The chlorine content of the base materials will appreciably reduce the flammability of the final body of foamed plastic material and the use of these materials will also increase the flexibility of the resulting body so that the bodies of foamed plastic material manufactured by the process according to the invention will fully meet the requirements of the building trade. The heat-stabilizing agents are required to prevent a decomposition of the base material consisting of the chlorinated polyethylene resin during the process whereas the cross-linking and foaming will not be adversely affected.

Within the scope of the invention, the chlorinated polyethylene resins comprise linear polyethylene and contain chlorine in an amount of 35 to 45% by weight, in order to ensure the high flexibility and low flammability which are required.

It has been found that particularly good results will be obtained if the base material consists of a mixture of about 40% chlorinated polyethylene resin which contains 36% by weight chlorine and about 60% chlorinated polyethylene resin which contains 42% by weight chlorine.

The heat-stabilizing agents consist of salts of lead, tin, calcium, cadmium or barium and/or of hydrogen chloride acceptors. The hydrogen chloride acceptors may consist of organic phosphites or of urea derivatives and/or compounds having reactive epoxide groups. Within the scope of the invention, optimal heat-stabilizing agents, which involve the least adverse affects regarding the cross-linking and foaming, consist of salts of lead and of tin and of compounds having reactive epoxide groups.

The invention will be explained more fully with reference to the following examples.

EXAMPLE 1

The following ingredients were mixed at temperatures below 60° C. to obtain a homogeneous mixture in a fluid mixer having a capacity of 100 liters:

22.5 kg chlorinated polyethylene resin containing 36% by weight chlorine and
32.5 kg chlorinated polyethylene resin containing 42% by weight chlorine
as a base material;
0.6 kg bisphenol epoxide resin,
0.5 kg lead stearate, and
0.7 kg dibutyl tin carboylate
as stabilizing agents;
0.65 kg 1,3-bis(t.butylperoxy-iropropyl)benzene and
1,00 kg triallylisocyanurate
as cross-linking agents;
0,5 kg polyethylene wax
as a lubricant; and
7.5 kg azodicarbonamide
as a foaming agent.

The resulting pulverulent mixture was extruded at temperatures below 120° C. to form a ribbon in a single-screw extruder, in which the ratio of the length to the diameter of the screw was 30:1. The resulting ribbon was smoothened by means of a calender while the ribbon was still warm, and was then cooled. When sections of said ribbon were heated in a hot air-circulating dryer at 190° to 195° C., they foamed within 6 minutes to form a light-yellow foamed plastic material having closed small cells and a specific gravity of 70 kg/m$^3$. The surface was planar and closed by a foamed skin.

EXAMPLE 2

The following ingredients were mixed as in Example 1:

22.5 kg chlorinated polyethylene resin containing 36% by weight chlorine and
32.5 kg chlorinated polyethylene resin containing 42% by weight chlorine
as a base material;
0.6 kg bixphenolepoxide resin,
0.5 kg basic lead stearate and
0.7 kg dibutyl tin maleinate
as stabilizing agents;
0.65 kg 1,1-bix(t.butylperoxide)3,3,5-trimethylcylohexane and
1.00 kg triallylosicyanurate
as cross-linking agents,
0.5 kg polyethylene wax
as a lubricant;
2.5 kg antimony oxide
as an additional fire-retarding agent;
0.07 kg carbon black paste and
0.80 kg titanium dioxide
as pigments; and
8,00 azodicarbonamide
as a foaming agent.

The processing of the mixture as described in Example 1 resulted in a light-grey foamed plastic material, which had small cells and a specific gravity of 56 kg/m³ and exhibited fire-retarding properties.

EXAMPLE 3

The following ingredients were mixed at a temperature of up to 65° C. in a fluid mixer:

50 kg chlorinated polyethylene resin containing 36% by weight chlorine
as a base material;
5 kg tricresylphosphate
as a plasticizer;
0.6 kg epoxidized soybean oil,
0.5 kg lead phosphite, and
0.7 kg dibutyl tin laurate
as stabilizers;
0.5 kg stearic acid
as a lubricant;
0.65 kg 2,5-dimethyl-2,5-bis(t.butylperoxy)hexane and
1,00 diallylmaleinate
as cross-linking agents;
7.00 azodicarbonamide
as a foaming agent; and
0.50 kg zinc borate,
0.50 kg antimony oxide, and
1.50 kg decarbromodiphenyl ether
as additional fire-retarding agents.

The cooled mixture, which trickled easily, was extruded at a temperature not in excess of 120° C. to form a tube having an outside diameter of 28 mm and a wall thickness of 8 mm in a twin-screw extruder having a ratio of 2×25:1 of screw length to screw diameter. Without using interstage cooling, the tube was continuously passed through a tunnel having a cross-linking zone in a length of 6 meters and in said zone was subjected to microwave irradiation so that the tube leaving the tunnel consisted of a foamed tube having small cells, an outside diameter of 120 mm and a wall thickness of 25 mm. The reaction was completed at 180° C. in a succeeding heating tunnel of 18 meters length. Then the tube was cooled with cold air and cut to desired lengths. Whereas the foamed tube was comparable to that of Example 2 in flexibility and fire resistance, the presence of the plasticizer resulted in an apprexiably lower resistance to ultraviolet radiation and an appreciably lower thermal stability under load.

What is claimed is:

1. A mixture for use in the manufacture of foamed plastic bodies, which comprises a base material consisting of a mixture of 40%, by weight, of linear chlorinated polyethylene containing 36%, by weight, of chlorine and 60%, by weight, of linear chlorinated polyethylene containing 42%, by weight, of chlorine, a heat-stabilizing agent selected from the group consisting of a hydrogen chloride acceptor and salt of lead, tin, calcium, cadmium and barium, with said hydrogen chloride acceptor being selected from the group consisting of organic phosphites, urea derivatives and compounds having reactive epoxide groups, a cross-linking agent and a foaming agent.

2. A flame-retardant, flexible, heat-insulating tubular foamed plastic body, comprising a base material consisting of a simultaneously cross-linked and foamed mixture of 40%, by weight, of linear chlorinated polyethylene containing 36%, by weight, of chlorine and 60%, by weight, of linear chlorinated polyethylene containing 42%, by weight, of chlorine, a heat-stabilizing agent selected from the group consisting of a hydrogen chloride acceptor and salt of lead, tin, calcium, cadmium and barium, with said hydrogen chloride acceptor being selected from the group consisting of organic phosphites, urea derivatives and compounds having reactive epoxide groups, a cross-linking agent and a foaming agent.

* * * * *